(12) United States Patent
Ohsawa et al.

(10) Patent No.: US 7,134,124 B2
(45) Date of Patent: Nov. 7, 2006

(54) THREAD ENDING METHOD AND DEVICE AND PARALLEL PROCESSOR SYSTEM

(75) Inventors: Taku Ohsawa, Tokyo (JP); Satoshi Matsushita, Tokyo (JP)

(73) Assignee: Nec Corporation, Tokyo (JP)

( * ) Notice: Subject to any disclaimer, the term of this patent is extended or adjusted under 35 U.S.C. 154(b) by 705 days.

(21) Appl. No.: 10/174,953

(22) Filed: Jun. 20, 2002

(65) Prior Publication Data

US 2003/0014472 A1 Jan. 16, 2003

(30) Foreign Application Priority Data

Jul. 12, 2001 (JP) ............................. 2001-212249

(51) Int. Cl.
*G06F 9/46* (2006.01)
*G06F 7/38* (2006.01)

(52) U.S. Cl. ................. 718/100; 718/106; 712/238; 712/231; 712/233

(58) Field of Classification Search ................ 718/100, 718/106; 712/216, 228, 231, 233, 238
See application file for complete search history.

(56) References Cited

U.S. PATENT DOCUMENTS

| 5,812,811 | A | * | 9/1998 | Dubey et al. ............... 712/216 |
| 5,867,704 | A | * | 2/1999 | Tanaka et al. ............... 718/105 |
| 5,913,059 | A | | 6/1999 | Torii |
| 6,389,446 | B1 | * | 5/2002 | Torii .......................... 718/100 |
| 6,523,059 | B1 | * | 2/2003 | Schmidt ..................... 718/100 |
| 6,687,812 | B1 | * | 2/2004 | Shimada ..................... 712/230 |
| 6,772,324 | B1 | * | 8/2004 | Akkary et al. ............... 712/235 |

FOREIGN PATENT DOCUMENTS

| EP | 0 697 653 A1 | 2/1996 |
| EP | 0 725 334 A1 | 8/1996 |
| JP | 10-027108 | 1/1998 |
| JP | 10-078880 | 3/1998 |

OTHER PUBLICATIONS

Torii et al., "Control Parallel On-Chip Multi-Processor: MUSCAT," Joint Symposium on Parallel Processing 1997, May 28, 1997, pp. 229-236.
Kobayashi et al., "SKY: A Processor Architecture that Exploits Instruction-Level Parallelism in Non-Numerical Applications," Joint Symposium on Parallel Processing 1998, IPSJ Symposium Series vol. 98, No. 7, Jun. 3, 1998, pp. 87-94.
Sohi et al., "Multiscalar Processors," The 22nd Annual International Symposium on Computer Architecture, Conference Proceedings, IEEE Computer Society Press, Jun. 22-24, 1995, pp. 414-426.
P. Evripidou, "$D^3$-Machine: A decoupled data-driven multithreaded architecture with variable resolution support," Parallel Computing 27, (2001), pp. 1197-1225, NH Elsevier.

* cited by examiner

*Primary Examiner*—Lewis A. Bullock, Jr.
*Assistant Examiner*—Camquy Truong
(74) *Attorney, Agent, or Firm*—Foley & Lardner LLP

(57) ABSTRACT

Each processor comprises a register for storing start address of a forked child thread and a comparator for detecting that the value of its own program counter is coincident with the start address stored in this register. Each processor sends a thread stop notice to a thread controller when the value of its own program counter is coincident with the start address of the forked child thread and ends the execution of a parent thread when receiving a thread end permission from the thread controller.

9 Claims, 8 Drawing Sheets

THREAD ENDING METHOD AND DEVICE AND PARALLEL PROCESSOR SYSTEM

BACKGROUNDS OF THE INVENTION

1. Field of the Invention

The present invention relates to a parallel processor system for dividing a single program into a plurality of threads and executing the above program in parallel by a plurality of processors, and more particularly to a thread ending method in the individual processors.

2. Description of the Related Art

As a method of processing a single program in parallel by a parallel processor system, there is a multi-thread executing method of dividing a program into instruction flow called as thread and executing the above program by a plurality of processors in parallel. As the articles describing this method, there are Japanese Patent Publication Laid-Open (Kokai) No. Heisei 10-27108 (hereinafter, referred to as article 1), "Suggestion of On-Chip Multiprocessor-Oriented Multi-Stream Control Architecture MUSCAT" (pp. 229–236, papers of Joint Symposium on Parallel Processing JSPP97, Information Processing Society of Japan, May 1997) (hereinafter, referred to as article 2), Japanese Patent Publication Laid-Open (Kokai) No. Heisei 10-78880 (hereinafter, referred to as article 3), "Processor Architecture SKY by Using Instruction Level Parallel among Threads of Nonnumeric Calculation Program" (pp. 87–94, papers of Joint Symposium on Parallel Processing JSPP98, Information Processing Society of Japan, June 1998) (hereinafter, referred to as article 4), "Multiscalar Processor" (G. S. Sohi, S. E. Breach and T. N. Vijaykumar, The 22nd International Symposium on Computer Architecture, pp. 414–425, IEEE Computer Society Press 1995) (hereinafter, referred to as article 5). The conventional technique described in these articles will be described below.

In a general multi-thread executing method, to generate a new thread on another processor is said as "fork a thread", a thread on the side of performing the fork operation is called as a parent thread, a newly generated thread is called as a child thread, a position to fork a thread is called as a fork point, and a head position of a child thread is called as a fork destination address or a staring point of a child thread. In the articles 1 to 4, a fork instruction is inserted in a fork point in order to instruct the thread fork. A fork destination address is specified in the fork instruction, a child thread starting from the fork destination address is generated in another processor by the execution of the fork instruction, and the execution of the child thread is started. Further, an instruction called as a term instruction for ending the processing of a thread is prepared, and each processor ends the processing of the thread by executing the term instruction. In the article 4, this term instruction is called as END instruction.

FIG. 8 shows an outline of the processing of the multi-thread executing method. FIG. 8(a) shows a single program divided into three threads A, B, and C. When a single processor processes the program, one processor PE sequentially processes the threads A, B, and C, as illustrated in FIG. 8(b). On the contrary, in the multi-thread executing method in the articles 1 to 5, one processor PE1 executes the thread A, so to generate the thread B in the other processor PE2 according to the fork instruction embedded in the thread A, while the processor PE1 is executing the thread A, and then the processor PE2 executes the thread B, as illustrated in FIG. 8(c). The processor PE2 generates the thread C in the processor PE3 according to the fork instruction embedded in the thread B. The processors PE1 and PE2 end the processing of the threads according to the term instructions embedded just before the starting points of the respective threads B and C, and when the processor PE3 executes the last instruction of the thread C, it executes the next instruction (generally, a system call instruction). As mentioned above, by simultaneously executing threads in parallel by a plurality of processors, the performance can be improved, compared with the serial processing.

As the other conventional multi-thread executing method, as illustrated in FIG. 8(d), there is a multi-thread executing method in which the processor PE1 executing the thread A performs a plurality of times of fork, so to generate the thread B in the processor PE2 and the thread C in the processor PE3 respectively. Contrary to the model of FIG. 8(d), the multi-thread executing method, as illustrated in FIG. 8(c), which is restricted to only one generation of an effective child thread according to a thread during its existence, is called as a Fork-Once Parallel Execution model. The Fork-Once Parallel Execution model can simplify the thread management greatly and a thread controller can be realized in hardware on a realistic hardware scale. Since in the individual processors, the other processor of generating a child thread is restricted to one processor, a parallel processor system with the adjacent processors connected with each other in a single direction like a ring, can execute a multi-thread. The present invention is assumed to use this Fork-Once Parallel Execution model.

When forking a child thread, it is necessary to inherit register values from the parent thread to the child thread. As for this register-value inheritance, generally, there are two methods. One method is, as adopted in the parallel processor systems of the articles 1 to 3, that only the content of a register file at a fork time of the parent thread is inherited and that the register values updated after fork are not inherited. The other method is, as adopted in the parallel processor systems of the articles 4 and 5, that the register values updated after fork are also to be inherited. The former is called as a fork-time register-values transfer method, and the latter is called as an after-fork register-values transfer method.

In the MUSCAT described in the article 2, a lot of exclusive instructions, such as a synchronization instruction between threads, for flexibly controlling the parallel operations of threads are provided.

In the above-mentioned conventional parallel processor system, it is necessary to describe a term instruction just before a starting point of a child thread without fail, in order to end a thread in the individual processors. Since one term instruction is required for every one thread, the ratio of the term instruction in the whole instructions becomes greater in a finer grain-sized thread including fewer instructions. Since the term instruction is stored in an instruction memory and becomes an object to be fetched similarly to the other instructions, there is a problem of deteriorating the performance caused by an increase of the hardware amount in the instruction memory and an increase of the number of instruction fetches.

SUMMARY OF THE INVENTION

In order to solve the above problem, the present invention is to reduce the amount necessary for an instruction memory and the number of the instruction fetches, by eliminating the term instruction for ending a thread, thereby to improve the performance.

Further, as describe in the articles 1 and the like, when parallel executing a plurality of threads related in a sequential order, there is a case of imposing such a restriction that a child thread cannot be ended unless a parent thread is ended, and this restriction is generally assured by a thread controller for controlling generation and end of threads. Accordingly, in the multi-thread execution having this restriction, according to the present invention, each processor ends the execution of a parent thread after getting permission from the thread controller when detecting that the value of its own program counter is in accord with the start address of the forked child thread.

According to the first aspect of the invention, a thread ending method in a parallel processor system of dividing a single program into a plurality of threads for executing the above program in parallel by a plurality of processors, the method comprising the steps of a step in which each processor ends execution of a parent thread when detecting that a value of its own program counter is coincident with start address of a forked child thread.

According to the second aspect of the invention, a thread ending method in a parallel processor system which comprises a plurality of processors, having a program counter and a register file individually, for fetching, decoding, and executing an instruction of a thread at once according to the corresponding program counter and a thread controller for controlling generation and end of threads, provided with a function of starting execution of a child thread in the other processor, the child thread starting from fork destination address specified by a fork instruction within a parent thread being executed by one of the processors, the method wherein each processor ends execution of the parent thread after receiving a permission from the thread controller when detecting that a value of its own program counter is coincident with start address of the forked child thread.

In the preferred construction, each processor sends a thread stop notice to the thread controller when detecting that the value of its own program counter is coincident with the start address of the forked child thread, and ends execution of the parent thread when receiving an end permission in reply to the thread stop notice.

According to the third aspect of the invention, a thread ending device in a parallel processor system of dividing a single program into a plurality of threads for executing the above program in parallel by a plurality of processors, wherein each processor has means for detecting that a value of its own program counter is coincident with start address of a forked child thread, and means for ending execution of a parent thread when detecting that the value of its own program counter is coincident with the start address of the forked child thread.

In another preferred construction, each processor sends a thread stop notice to the thread controller when detecting that the value of its own program counter is coincident with the start address of the forked child thread, and ends execution of the parent thread when receiving an end permission in reply to the thread stop notice.

According to another aspect of the invention, a thread ending device in a parallel processor system which comprises a plurality of processors, having a program counter and a register file individually, for fetching, decoding, and executing an instruction of a thread at once according to the corresponding program counter and a thread controller for controlling generation and end of threads, provided with a function of starting execution of a child thread in the other processor, the child thread starting from fork destination address specified by a fork instruction within a parent thread being executed by one of the processors, wherein each processor has detecting means for detecting that a value of its own program counter is coincident with start address of a forked child thread and means for ending execution of a parent thread after receiving a permission from the thread controller when detecting that the value of its own program counter is coincident with the start address of the forked child thread.

In the preferred construction, each processor has a register for storing the start address of the forked child thread, and the detecting means detects that the value of its own program counter is coincident with the start address stored in the above register.

In another preferred construction, each processor sends a thread stop notice to the thread controller when detecting that the value of its own program counter is coincident with the start address of the forked child thread, and ends execution of the parent thread when receiving a end permission in replay to the thread stop notice.

According to another aspect of the invention, a parallel processor system comprising a plurality of processors, having a program counter and a register file individually, for fetching, decoding, and executing an instruction of a thread at once according to the corresponding program counter and a thread controller for controlling generation and end of threads, provided with a function of starting execution of a child thread in the other processor, the child thread starting from fork destination address specified by a fork instruction within a parent thread being executed by one of the processors, wherein each processor has a register for storing start address of a forked child thread, detecting means for detecting that a value of its own program counter is coincident with the start address stored in the register, and means for ending execution of the parent thread when detecting that the value of its own program counter is coincident with the start address of the forked child thread.

In the preferred construction, each processor has the register for storing the start address of the forked child thread, and the detecting means detects that the value of its own program counter is coincident with the start address stored in the above register.

According to a further aspect of the invention, a parallel processor system comprising a plurality of processors, having a program counter and a register file individually, for fetching, decoding, and executing an instruction of a thread at once according to the corresponding program counter and a thread controller for controlling generation and end of threads, provided with a function of starting execution of a child thread in the other processor, the child thread starting from fork destination address specified by a fork instruction within a parent thread being executed by one of the processors, wherein each processor has a register for storing start address of a forked child thread and detecting means for detecting that a value of its own program counter is coincident with the start address stored in the register, and each processor ends execution of the parent after receiving a permission from the thread controller when detecting that the value of its own program counter is coincident with the start address of the forked child thread.

In the preferred construction, each processor has the register for storing the start address of the forked child thread, and the detecting means detects that the value of its own program counter is coincident with the start address stored in the above register.

In another preferred construction, each processor sends a thread stop notice to the thread controller when detecting that the value of its own program counter is coincident with the start address of the forked child thread and ends execution of the parent thread when receiving an end permission in reply to the thread stop notice.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order to not unnecessarily obscure the present invention.

Figure 1:
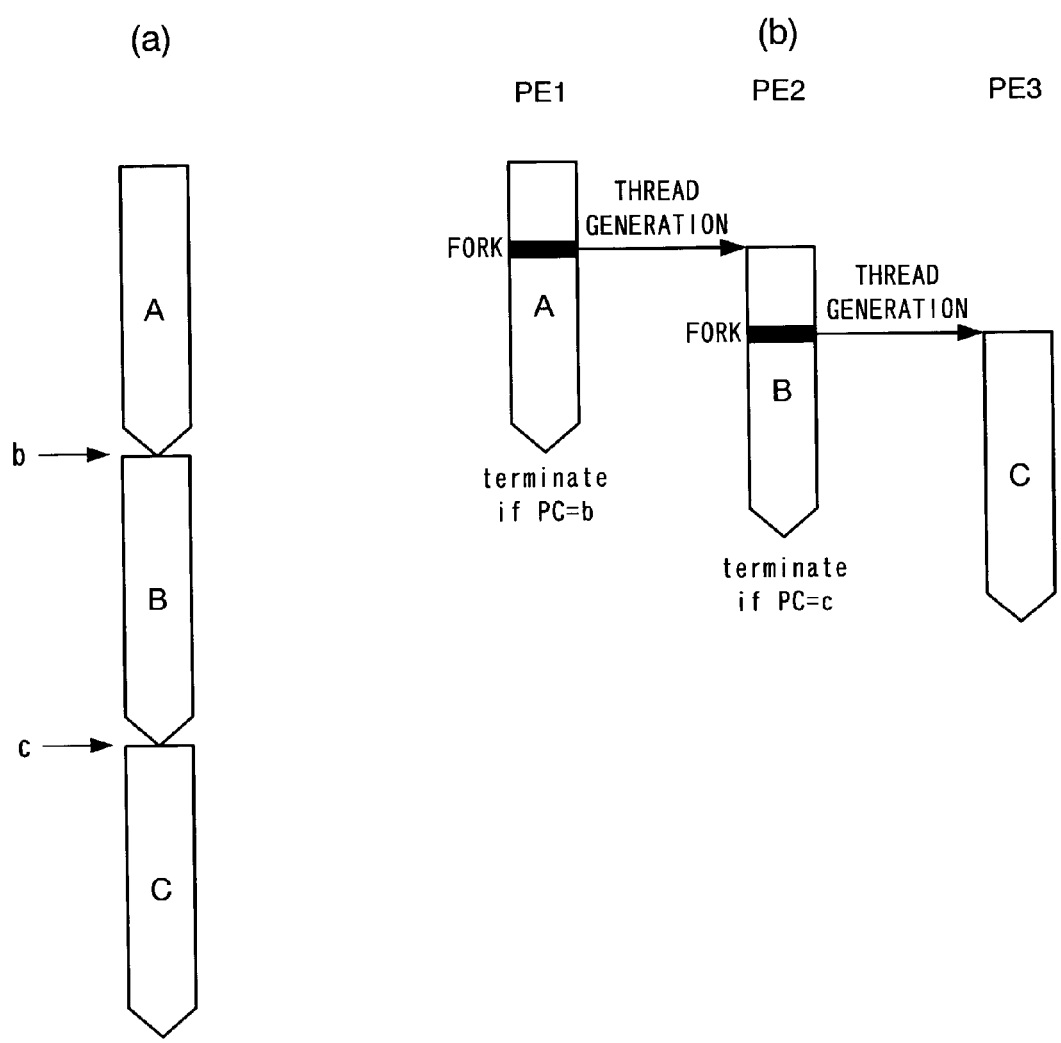
FIGS. 1(a) and 1(b) are views for use in describing a function of the present invention.

According to the present invention, a processor executing a parent thread that forks a child thread operates to end the parent thread when the value of its program counter is in accord with the start address of the child thread, and therefore, it is not necessary to describe any term instruction within a parallel program. Hereafter, a function of the present invention will be described with reference to FIG. 1.

FIG. 1(a) shows a single program divided into three threads A, B, and C. Here, it is assumed that the start address of the thread B is b and that the start address of the thread C is c. As illustrated in FIG. 1(b), the thread A is executed by one processor PE1, the thread B is generated in the other processor PE2 by a fork instruction embedded in the thread A, during the execution of the thread A by the processor PE1, and the thread B starting from the start address b is executed in the processor PE2. Further, the processor PE2 generates the thread C in the processor PE3 according to a fork instruction embedded in the thread B, and the thread C starting from the start address c is executed in the processor PE3. The processor PE1 executing the thread A ends the thread A when the value of its own program counter (PC) is in accord with the start address b of the thread B, and the processor PE2 executing the thread B ends the thread B when the value of its own program counter (PC) is in accord with the start address c of the thread C.

Figure 2:
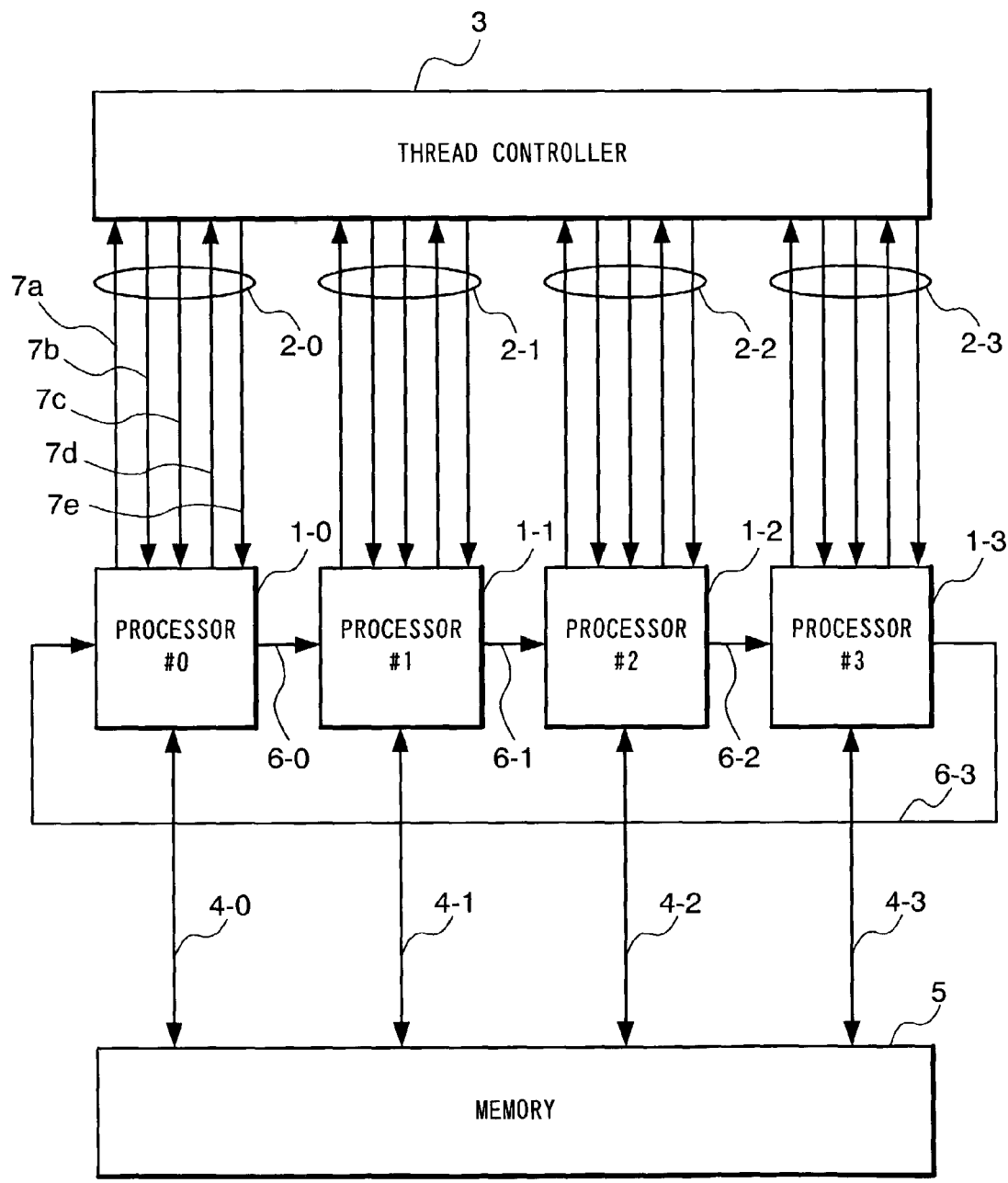
FIG. 2 is a block diagram showing an example of a parallel processor system to which the present invention is adopted.

Referring to FIG. 2, this example of a parallel processor system to which the present invention is adopted is a four-thread parallel executing processor, and four processors 1-i (i=0 to 3) are connected to a thread controller 3 for generating and ending threads, through signal lines 2-i and they are connected to a shared memory 5 through signal lines 4-i. The adjacent processors are respectively connected with each other through communication buses 6-i in a single direction like a ring. In this example, although a four-thread parallel executable processor is taken as an example, the present invention is generally applicable to n(n≧2)-thread parallel executable processor, such as 8-thread and 16-thread parallel executable processors.

Each processor 1-i has a program counter (hereinafter, referred to as PC) and a register file individually, and it is provided with a function of fetching, interpreting, and executing thread instructions within the memory 5 at once according to the PC. Each processor 1-i starts the execution of a thread when receiving a thread starting request 7c accompanied by a target PC value from the thread controller 3 through each signal line 2-i. At this point, the corresponding processor 1-i is regarded as being in a busy state by the thread controller 3. The processor 1-i ending the execution of a thread sends a thread stop notice 7d to the thread controller 3 through the corresponding signal line 2-i. This thread stop notice 7d is accepted by the thread controller 3 under the condition that the processor 1-i of the notice source is executing the oldest parent thread, and the thread controller 3 regards the above processor 1-i as being free and returns a thread end permission 7e to the processor 1-i. The processor 1-i ends the execution of the thread upon receipt of the thread end permission 7e.

Each processor 1-i can fork a child thread in one neighboring processor 1-j (i≠j) according to a fork instruction included in the currently executing parent thread (the processor 1-0 can fork it in the processor 1-1; the processor 1-1, in the processor 1-2; the processor 1-2, in the processor 1-3; and the processor 1-3, in the processor 1-0). When forking a child thread, each processor 1-i sends a fork request 7a accompanied by the fork destination address (start PC value) of a child thread to the thread controller 3 through each signal line 2-i. Upon receipt of the fork request 7a, the thread controller 3 determines whether the fork toward the other neighboring processor 1-j is possible or not, based on the state of the neighboring processor; if it is possible, the thread controller 3 sends the thread starting request 7c accompanied by the fork destination address to the above processor 1-j, while it returns a fork reply 7b to the processor 1-i of the fork request source. The processor 1-i receiving the fork reply 7b performs the register-value inheritance to transfer the values of a register of the parent thread to the fork destination processor 1-j through the communication bus 6-i, and the processor 1-j receiving the thread starting request 7c starts the execution of the child thread from the fork destination address.

Figure 3:
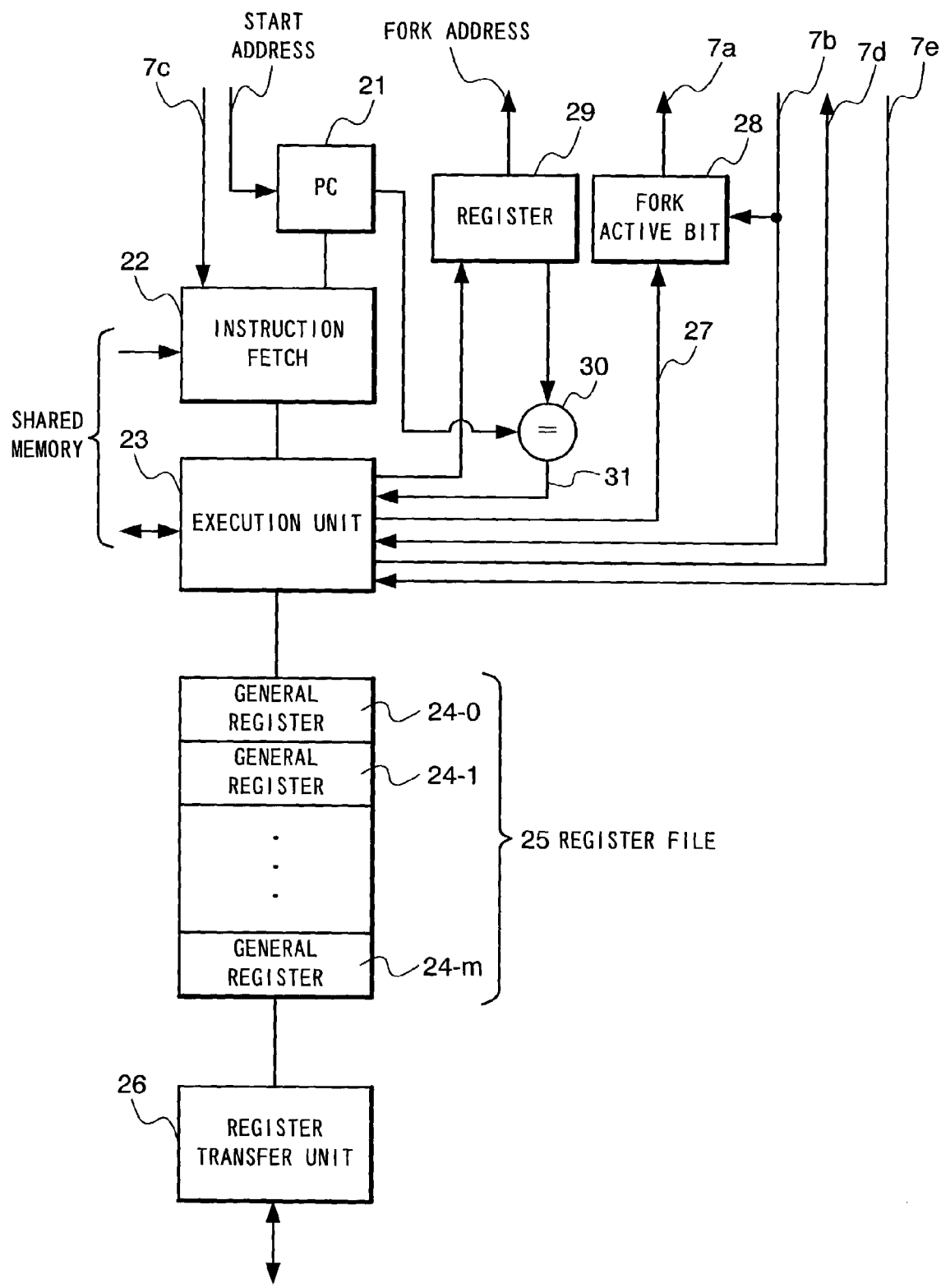
FIG. 3 is a block diagram showing an example of the structure of a processor in the parallel processor system according to a first embodiment of the present invention.

Referring to FIG. 3, each processor 1-i comprises the PC 21 where the start address value accompanying the thread starting request 7c sent from the thread controller 3 is set and thereafter, properly updated, an instruction fetch unit 22 for fetching an instruction of a thread from the memory 5 according to the PC 21, an execution unit 23 for decoding the fetched instruction and executing it, a register file 25 that is a collection of general registers 24-0 to 24-m, a register transfer unit 26 for transferring the content of the register file 25 to the fork destination processor through the communication bus 6-i, a fork active bit 28 which is set by the fork signal 27 supplied when the execution unit 23 executes a fork instruction and reset by the fork reply 7b received from the thread controller 3 and the output from which becomes the fork request 7a, a register 29 for storing the fork destination address accompanying the fork request 7a, and a comparator 30 for detecting whether the value of the PC 21 is coincident with the fork destination address stored in the register 29 and supplying a coincidence signal 31 to the execution unit 23 when detecting the coincidence.

Each processor 1-i starts the execution of the thread according to the thread starting request 7c from the start address accompanying the above request. The execution unit 23 sets the fork active bit 28 according to the fork signal 27 at an execution time of the fork instruction, stores the fork destination address in the register 29, and sends the fork request 7a with the fork destination address attached there to the thread controller 3. Further, the execution unit 23 sends the thread stop notice 7d to the thread controller 3, in order to end the processing of the thread, when the value of the PC 21 is coincident with the fork destination address stored in the register 29 and the coincidence signal 31 is supplied from the comparator 30, and upon receipt of the thread end permission 7e from the thread controller 3, the execution unit 23 ends the processing of the thread.

The register transfer unit 26 is a unit for transferring a register to be inherited from the parent thread to the child thread forked, and more particularly, it performs the processing of sending the value of each register and each register number (register addresses) of the register file 25 to a register file of the fork destination processor, in every number of registers that can be transferred at once depending on the width of the communication bus 6-i.

Figure 4:
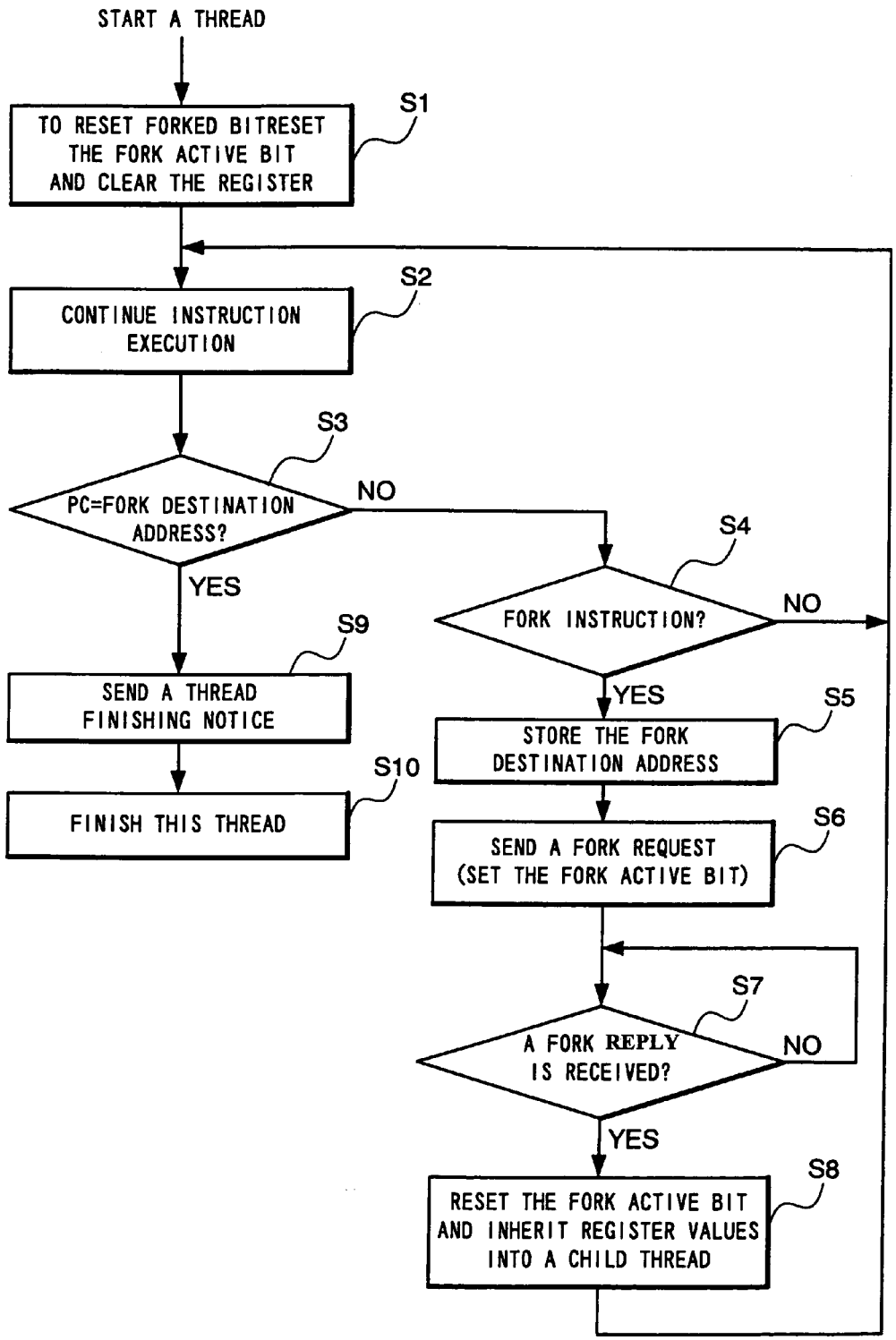
FIG. 4 is a flow chart showing an example of the processing by a processor from start to end of a thread, in the parallel processor system according to the first embodiment of the present invention.

The outline of the processing of the processor 1-i from start to end of a thread will be shown in FIG. 4. According to the thread starting request 7c from the thread controller 3, when the processor 1-i starts the execution of one thread, the fork active bit 28 of the same processor 1-i is reset and the content of the register 29 is cleared (Step S1). Thereafter, fetch, decode, and execution of a thread instruction will be continuously performed (Step S2).

When the instruction decoded by the execution unit 23 is a fork instruction (YES in Step S4), the execution unit 23 stores the fork destination address specified by the fork instruction into the register 29 (Step S5), and sets the fork active bit 28 according to the fork signal 27, hence to send the fork request 7a accompanied by the fork destination address stored in the register 27 to the thread controller 3 (Step S6). Then, it waits for the fork reply 7b from the thread controller 3 (Step S7).

The thread controller 3 returns the fork reply 7b to the processor 1-i of the request source, during transmission of the fork request 7a from the processor 1-i, when a fork toward the neighboring processor 1-i becomes possible, and sends the thread starting request 7c to the neighboring processor 1-j. Upon receipt of the fork reply 7b from the thread controller 3, the processor 1-i resets the fork active bit 28, and the register transfer unit 26 performs the operation of register-value inheritance to transfer the content of the register file 25 of the parent thread to the register file of the fork destination processor 1-j through the communication bus 6-i (Step S8). While, the fork destination processor 1-j performs the processing later than Step S1 of FIG. 4.

When the processor 1-i advances the execution of the instruction until the value of the PC 21 is coincident with the fork destination address stored in the register 29 (YES in Step S3), the comparator 30 supplies the coincidence signal 31 to the execution unit 23, and the execution unit 23 starts the ending processing of the thread. More specifically, the thread stop notice 7d is sent to the thread controller 3 (Step S9), and at a time of receiving the thread end permission 7e from the thread controller 3, the processing of the thread is ended (Step S10).

According to the form of the embodiment, since a thread is ended after detecting that the execution of an instruction has been advanced to the starting point of the child thread, a conventional term instruction is not necessary. Accordingly, in a compiler for generating a parallel program for the embodiment from a serial processing program, a fork instruction is inserted in a fork point, but a term instruction hitherto inserted just before the starting point of a child thread is not inserted, when a parallel program is generated and supplied after analyzing a control flow and data flow of the serial processing program, dividing a basic block or a plurality of basic blocks by the unit for paralleling, that is the thread, and inserting a code for paralleling.

Although, in the above-mentioned first embodiment, the execution of the parent thread is waited until a fork actually becomes possible at a time of a fork instruction (Step S7 in FIG. 4), this embodiment is designed in that the content of a register file is saved when a fork is impossible at a point of a fork instruction and that a fork of a child thread is performed based on the saved information when the fork becomes possible. A second embodiment will be described mainly on a difference between the first embodiment and this embodiment.

Figure 5:
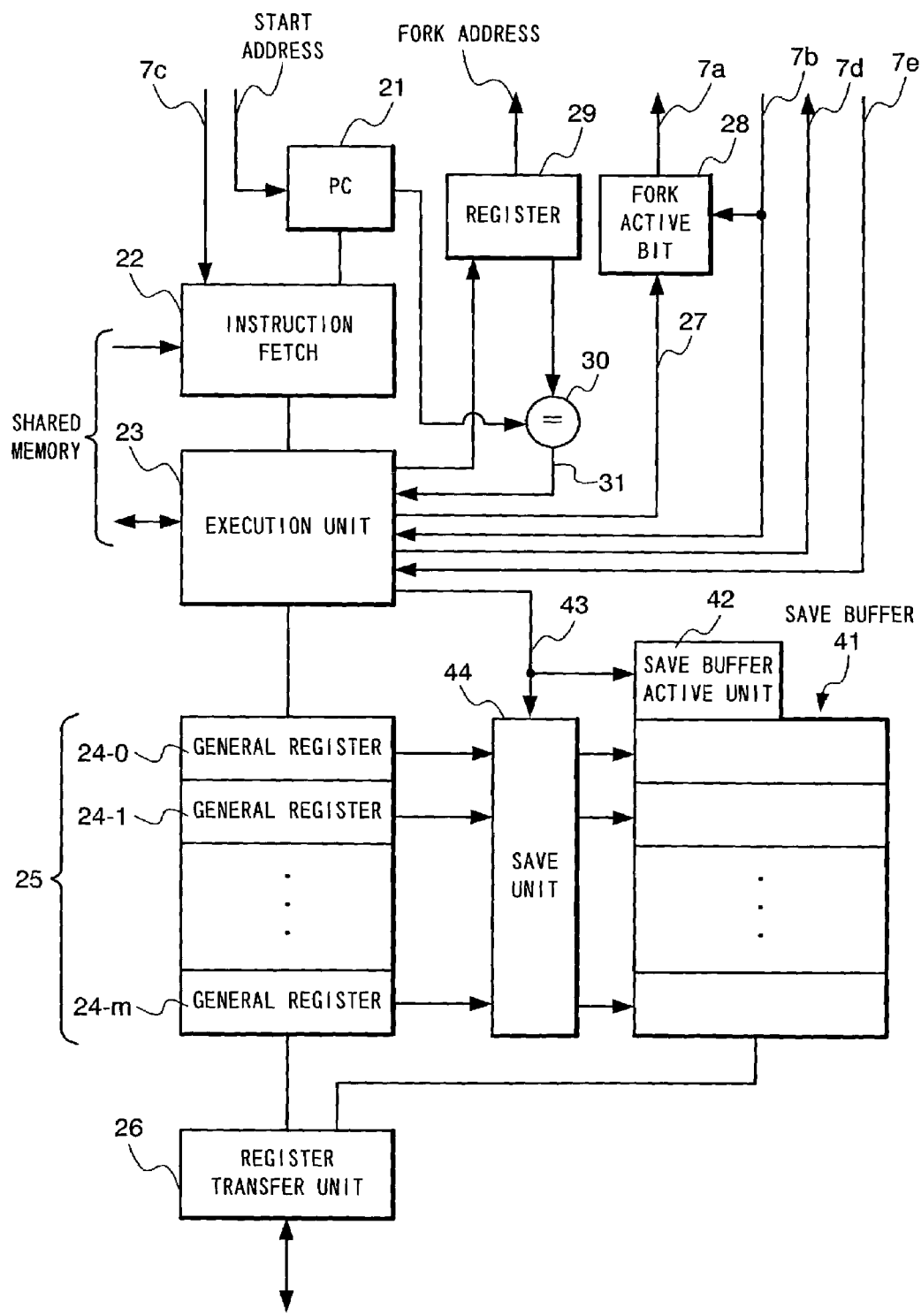
FIG. 5 is a block diagram showing an example of the structure of a processor in a parallel processor system according to a second embodiment of the present invention.

Referring to FIG. 5, each processor 1-i of a parallel processor system of this embodiment further comprises a save buffer 41, a save buffer active bit 42, and a save unit 44 for saving the content of the register file 25 into the save buffer 41 upon activation according to a save signal 43 supplied from the execution unit 23, in addition to the structure shown in FIG. 3, and the register transfer unit 26 is connected to the register file 25 and the save buffer 41. The save buffer active bit 42 is reset at a start time of a thread, set according to the save signal 43, and further reset at a fork based on the save buffer 41.

Figure 6:
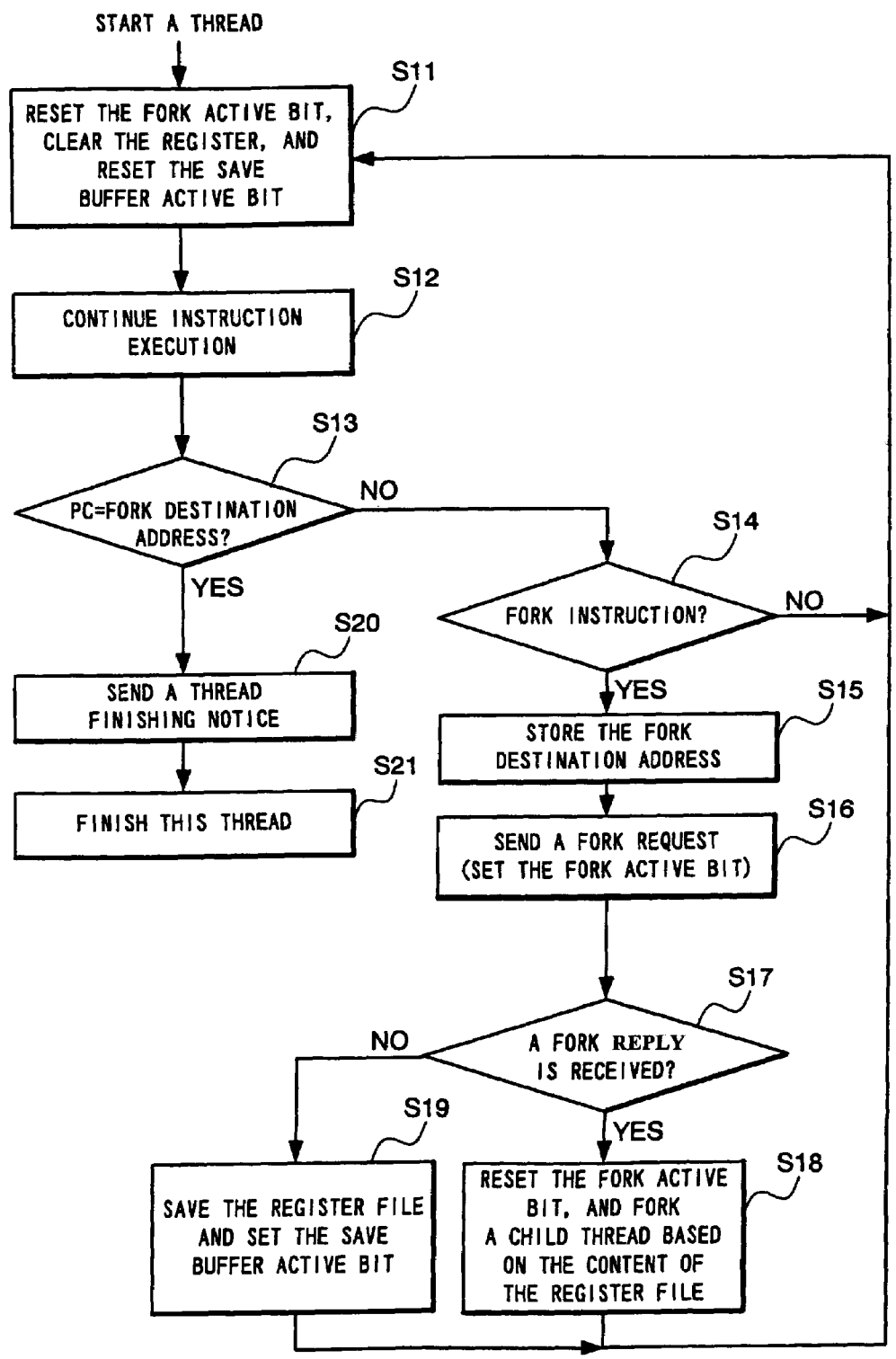
FIG. 6 is a flow chart showing an example of the processing by a processor from start to end of a thread, in the parallel processor system according to the second embodiment of the present invention.
Figure 7:
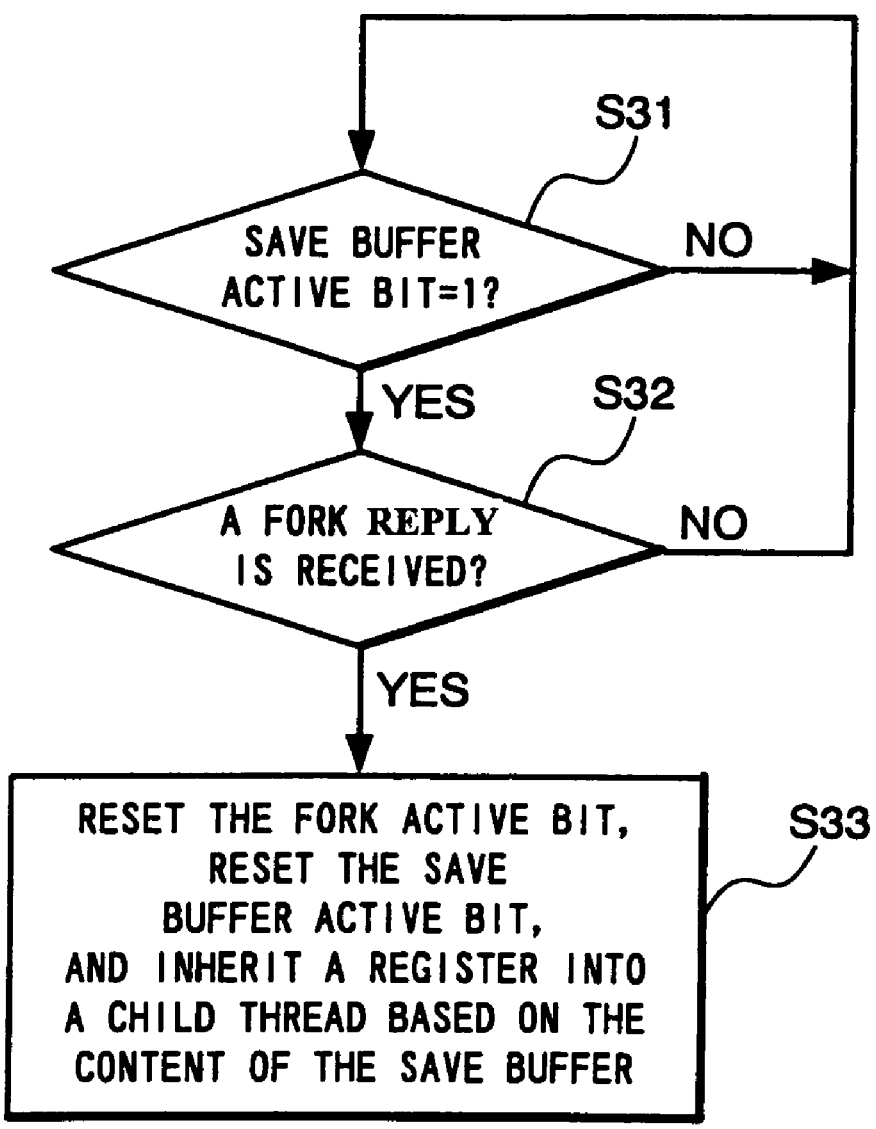
FIG. 7 is a flow chart showing an example of the processing by a processor from start to end of a thread, in the parallel processor system according to the second embodiment of the present invention.
Figure 8:
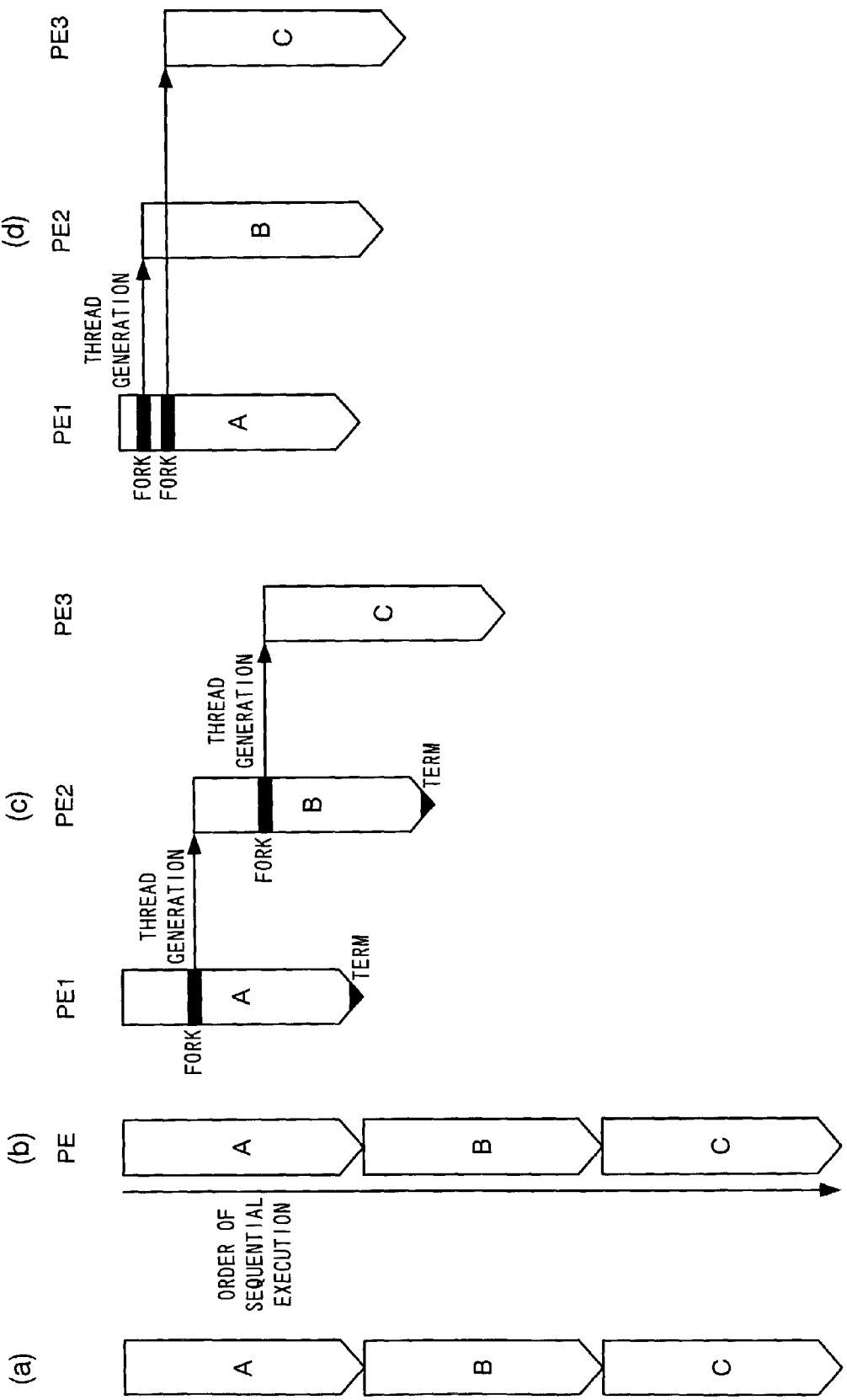
FIGS. 8(a)–8(d) are views showing an outline of the processing of the conventional multi-thread executing method.

The outline of the processing of the processor 1-i from start to end of a thread is shown in FIG. 6 and FIG. 7. When the execution of one thread is started in the processor 1-i, based on the thread starting request 7c from the thread controller 3, the fork active bit 28 and the save buffer active bit 42 of the same processor 1-i are reset and the content of the register 29 is cleared (Step S11). Hereinafter, fetch, decode, and execution of the thread instruction is continuously performed (Step S12).

When the instruction decoded by the execution unit 23 is a fork instruction (YES in Step S14), the execution unit 23 stores the fork destination address in the register 29 (Step S15), and sends the fork request 7a accompanied by the fork destination address to the thread controller 3 by setting the fork active bit 28 according to the fork signal 27 (Step S16). When the fork reply 7b is returned from the thread controller 3 within a predetermined hour (YES in Step S17), the fork active bit 28 is reset and the content of the register file 25 is transferred to the fork destination processor 1-j by the register transfer unit 26 (Step S 18).

On the other hand, when the fork reply 7b is not returned from the thread controller 3 within a predetermined hour (NO in Step S17), the content of the register file 25 is saved in the save buffer 41 by activating the save unit 44 according to the save signal 43, and the save buffer active bit 42 is set (Step S19). While the save buffer active bit 42 is being set, if receiving the fork reply 7b from the thread controller 3, as illustrated in FIG. 7 (YES in Steps S31 and S32), the content of the register file 25 saved in the save buffer 41 is transferred to the fork destination processor 1-j by the register transfer unit 26 (Step S33). At this time, the fork active bit 28 and the save buffer active bit 42 are reset.

When the execution of the instruction advances in the processor 1-i until the value of the PC 21 becomes coincident with the fork destination address stored in the register 29 (YES in Step S13), the coincidence signal 31 is supplied from the comparator 30 to the execution unit 23, and the execution unit 23 sends the thread stop notice 7d to the thread controller 3 (Step S20). At a time of receiving the thread end permission 7e from the thread controller 3, the processing of the thread is ended (Step S21).

As set forth hereinabove, although the present invention has been described taking some embodiments as example, the present invention is not restricted to the above embodiments but various additions and modifications are possible. For example, although, in the above-mentioned embodiments, the fork-time register transfer method has been assumed, the present invention is also applicable to the multi-thread executing method of an after-fork register transfer method. Although the present invention has been adopted to a parallel processor system of concentrated thread controlling type in which a plurality of processors are provided with the thread controller 3 in common, the present invention is also applicable to a parallel processor system of distributed thread controlling type in which the thread controllers are provided in the respective processors, as described in the article 1. Further, although the register transfer has been performed by using the communication bus connecting the adjacent processors with each other in a single direction like a ring, a parallel processor system with all the processors connected to a common communication bus would perform a register transfer by using the same common communication bus.

As set forth hereinabove, according to the present invention, it is not necessary to describe a term instruction just before the starting point of a child thread, and elimination of the term instruction makes the size of a program compact. Therefore, it can improve the performance by reducing the capacity necessary for an instruction memory and the number of instruction fetches.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A thread ending method in a parallel processor system, said parallel processor system including a plurality of processors, a processor of said plurality of processors being configured to execute a parent thread of a program, said parent thread of said program including a plurality of instructions, one instruction of said plurality of instructions being a fork instruction tat specifies a fork destination address of a child thread, the thread ending method comprising:

storing said fork destination address of said fork instruction;

detecting when a value of a program counter of said processor is coincident with said stored fork destination address of said fork instruction of said parent thread of said program; and ending execution of said parent thread by said processor upon detecting that the value of the program counter of said processor is coincident with said stored fork destination address of said fork instruction of said parent thread of said program.

2. A thread ending method in a parallel processor system, said parallel processor system comprising a plurality of processors, each processor of said plurality of processors having a program counter and a register file and being configured to fetch, decode, and execute instructions of a thread in accordance with the program counter, said parallel processor system further comprising a thread controller for controlling starting and ending of threads, said thread controller provided with a function of starting execution of a child thread in a first processor of said plurality of processors, the child thread starting from a fork destination address that is specified by a fork instruction within a parent thread being executed by a second processor of said plurality of processors, said method comprising:

storing, by said second processor, said fork destination address specified by said fork instruction;

detecting, by said second processor, when a value of the program counter of the second processor is coincident with the stored fork destination address;

sending, by said second processor, a thread stop notice to said thread controller when said second processor detects that said value of said program counter of said second processor is coincident with said stored fork destination address;

receiving, by said second processor, a thread end permission from said thread controller in reply to said thread stop notice; and ending, by said second processor, execution of the parent thread after receiving said thread end permission from the thread controller.

3. A parallel processor system for executing, in parallel, a single program that has been divided into a plurality of threads, said parallel processor system comprising:

a plurality of processors, each processor of said plurality of processors comprising:

means for storing a fork destination address of a child thread that is specified by a fork instruction that is part of a parent thread of said plurality of threads that is being executed by said processor;

means for detecting when a value of a program counter of the processor is coincident with said fork destination address that is stored in said means for storing; and means for ending execution of said parent thread when said means for detecting detects that the value of the program counter of the processor is coincident with the fork destination address.

4. The parallel processor system as set forth in claim 3, wherein said means for storing of each processor of said plurality of processors comprises a register for storing the fork destination address of the fork instruction that is part of the parent thread of said plurality of threads that is being executed by said processor; and wherein the means for detecting of each processor of said plurality of processors detects when the value of the program counter of the processor is coincident with the fork destination address that is stored in the register of the processor.

5. A parallel processor system for executing, in parallel, a single program that has been divided into a plurality of threads, said parallel processor system comprising:

a plurality of processors, each processor of said plurality of processors comprising a program counter and a register file for fetching, decoding, and executing instructions of a corresponding parent thread of said plurality of threads; and a thread controller for controlling starting and ending of threads;

wherein each processor of said plurality of processors further comprises:

means for storing a fork destination address of a child thread specified by a fork instruction that is part of said corresponding parent thread of said plurality of threads that is being executed by said processor;

means for detecting when a value of the program counter of the processor is coincident with the fork destination address stored in said means for storing; and means for ending execution of said corresponding parent thread after receiving a thread end permission from the thread controller when said means for detecting detects that the value of the program counter is coincident with the fork destination address.

6. The parallel processor system as set forth in claim 5, wherein the means for storing of each processor of said plurality of processors comprises a register for storing the fork destination address specified by the fork instruction that is part of said corresponding parent thread of said plurality of threads that is being executed by said processor.

7. The parallel processor system as set forth in claim 5, wherein each processor of said plurality of processors further comprises:

means for sending a thread stop notice to the thread controller after said means for detecting detects that the value of the program counter of the processor is coincident with the fork destination address, and means for receiving the thread end permission from the thread controller in reply to the thread stop notice.

8. A system, comprising:

a first processor for executing a parent thread of a program, said parent thread of said program including a fork instruction that specifies a fork destination address that is a starting address of a child thread of said program to be executed on a second processor, said first processor comprising:

a program counter for storing an address of a current instruction of said parent thread to be executed by said first processor, said address in said program counter being updated each time said first processor executes an instruction of said parent thread, a register for storing said fork destination address of said fork instruction when said first processor executes said fork instruction;

a comparator for providing a comparison signal that indicates whether said address stored in said program counter is a same address as said fork destination address stored in said register; and an execution unit for executing instructions of said parent thread, and for ending execution of instructions of said parent thread when said comparison signal provided by said comparator indicates that said address stored in said program counter is the same address as said fork destination address stored in said register.

9. The system of claim 8, further comprising:

a thread controller for receiving a thread end notice signal from said first processor and for providing a thread end permission signal to said first processor in reply to said thread end notice signal;

wherein said execution unit of said first processor is configured to provide said thread end notice signal to said thread controller when said comparison signal provided by said comparator indicates that said address stored in said program counter is the same address as said fork destination address stored in said register; and wherein said execution unit of said first processor is configured to end execution of instructions of said parent thread when said first processor receives said thread end permission signal from said thread controller.

* * * * *